G. W. KRICK.
REAR SIGHT MIRROR FOR VEHICLES.
APPLICATION FILED FEB. 9, 1920.
1,363,603. Patented Dec. 28, 1920.
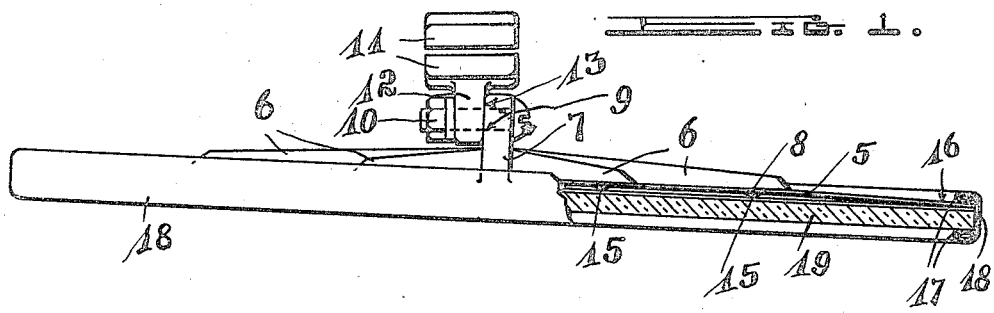
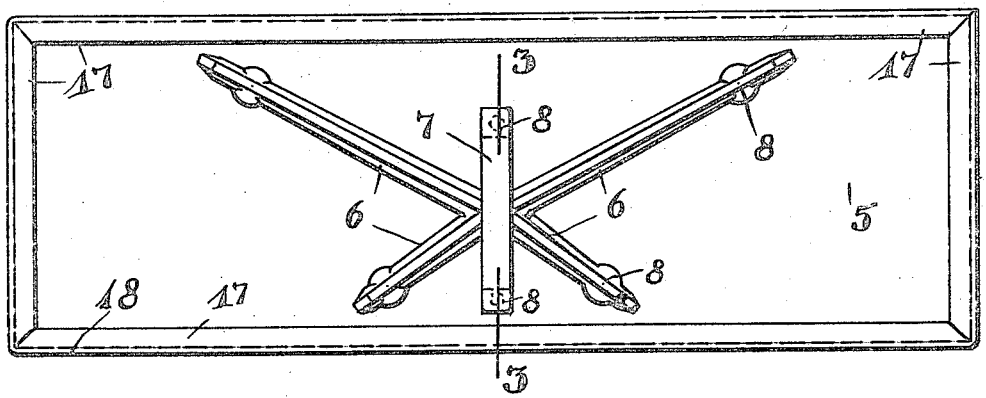
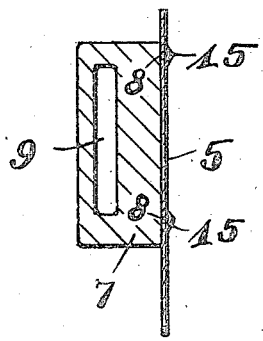 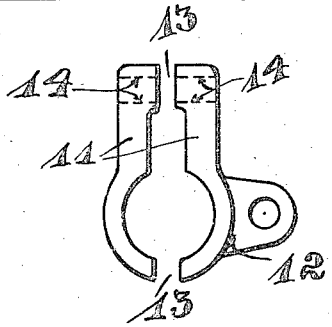
George W. Krick INVENTOR

UNITED STATES PATENT OFFICE.

GEORGE W. KRICK, OF LOS ANGELES, CALIFORNIA.

REAR-SIGHT MIRROR FOR VEHICLES.

1,363,603.  Specification of Letters Patent.  Patented Dec. 28, 1920.

Application filed February 9, 1920. Serial No. 357,210.

*To all whom it may concern:*

Be it known that I, GEORGE W. KRICK, a citizen of the United States, residing at Los Angeles, in the county of Los Angeles and State of California, have invented a new and useful Rear-Sight Mirror for Vehicles, of which the following is a specification.

This invention relates to devices disposed at a suitable point near the driver's seat in a vehicle, in sight of the driver while driving, reflecting occurrences and things normally not visible or perceptible by the driver while driving.

One of the objects of this invention is to reflect to the driver any occurrence or object in the rear of the driver while looking ahead when driving.

Another object is to reflect to the driver any occurrence or object in rear of the driver, but not reflecting the driver in the mirror.

Another object is to provide a device which can be attached to the windshield of a vehicle a suitable distance sidewise in front of the driver.

Another object is to provide a device which can be attached to the windshield of a vehicle a suitable distance sidewise in front of the driver, being provided with means bringing the device at an angle so as to reflect occurrences and objects in rear of the driver but not showing or reflecting the driver.

Another object is to provide a mirror holder which engages the glass properly thereby preventing the glass from vibrating or moving within the holder.

Other objects will appear from the following description and appended claims as well as from the accompanying drawing, in which—

Figure 1 is a top plan view of the device.

Fig. 2 is a rear-side elevation of the device without the clamping member.

Fig. 3 is a cross section on line 3—3 of Fig. 2 of the holding plate of the device.

Fig. 4 is a side elevation of the clamping member of the device.

The base plate 5 forms the back as well as the supporting member of the device. Die-cast ribs 6 are secured to the base-plate 5. A projecting end 7 is a part of the casting. The base-plate is provided with a suitable number of holes or perforations 8, see Figs. 1, 2 and 3, through which the material of the casting is allowed to pass so that the base plate is rigidly secured to the casting when cast in the die, thereby making the projecting end 7 a rigid part of the base plate 5, as will easily be understood from the illustrations. The projecting end 7 is provided with a slot 9 through which a bolt or similar suitable means 10 is disposed. The projecting end 12 of the clamping member 11 is provided with a sloping or inclined face 13 so as to bring the base plate 5 with its projecting end 7 in suitably inclined position to the center of the clamping member. Such inclined interconnection is for the purpose of establishing a suitable position for the device when attached to a wind shield of a vehicle. Having the clamping member 11 attached to the frame of the wind shield or any other similar suitable place near the wind shield or in a similar suitable position in relation to the driver, and attaching the base-plate 5 by its extension end or projecting end 7 through such inclined surface to the projecting end 12 of the clamping member 11, naturally brings the base plate into a certain inclined position. Such inclined position has been established so as to bring the device a suitable distance sidewise of the driver so as to reflect occurrences and objects in the rear of the driver without reflecting anything of the driver, giving a clear view. The clamping member has been designed so that it can be moved to a suitable point, being simply made of two parts easily clasping over any device of a size which will fit between the two parts of the clamping member, as will easily be understood without further illustration. In Fig. 4 is the clamping member illustrated in detail, clearly showing the two parts split or separate as at 13 and provided with a hole 14 for a connecting bolt to clamp the clamping member to a device as described above.

By die-casting the ribs 6 to the base plate 5 through the holes 8, there is enough material to form nearly or neatly sharpened points 15, see Figs. 1 and 3. The edges 16 of the base plate are then naturally to a certain extent under bending stress when disposed under the flanges 17 of the frame 18, see Fig. 1, especially in the sectional portion of that illustration it will clearly be noticed that the edges are bent toward the glass 19 as far as that plate projects beyond the points 15 on the plate 5. Such arrangement tends to firmly engage the glass and base plate within the frame 18, as will easily be understood.

One of the main points in view is to provide a rear sight mirror for automobiles which can be attached to the front windshield to provide a full view of the road in the rear through the curtain windows in the back of the automobile. In order to provide a universal mirror adjustable to any automobile, it is necessary to have a given vertical and an undetermined horizontal angle, as well as means for adjusting vertically. The usual method of providing the angles is by means of a ball and socket arrangement, which however is unsatisfactory for the reason of its tendency to vibrate and work itself loose. The device must also be constructed so that it is easy to attach the device, and, by simply attaching it, to bring it into proper position a suitable distance sidewise of the user so it will not reflect any part of the user but so much in front of the user that it will give a full view of the rear. This I accomplish by the above-described means, especially by providing the projecting end, or more correctly, the interconnection between the clamping member and the mirror proper at a suitable angle so that the device will automatically come into correct position as soon as it is attached by such means.

Having thus described my invention, I claim:

1. In a device of the class described, a looking glass, a base plate having perforations, attaching means of die-cast material adapted to engage with the base plate through such perforations in the base plate thereby forming projecting points on the opposite side of the base plate when so die-casted to the base plate, and a frame for holding the base plate securely engaged against the looking glass.

2. In a device of the class described, in combination with a base plate having perforations, and a looking glass disposed before the base-plate, attaching means of die-cast material adapted to engage with the base plate through such perforations in the base plate thereby forming projecting points on the opposite side of the base plate when so die-casted to the base plate to form friction means to engage with the looking glass.

3. In a device of the class described, in combination with attaching means of die-cast material adapted to engage itself by its being made in such die-cast form and a looking glass, a base plate having perforations according to such die-cast form adapted to allow the securing of the attaching means when so placed in the die-cast form so as to have friction means in its face from metal of the die-cast attaching means protruding through such perforations to engage with the looking glass when such is disposed in front of the base plate.

In testimony that I claim the foregoing as my invention I have signed my name in the presence of two subscribing witnesses.

GEORGE W. KRICK.

Witnesses:
OTTO H. KRUEGER,
JESSIE A. MANOCK.